United States Patent [19]

Machida et al.

[11] Patent Number: 5,062,027
[45] Date of Patent: Oct. 29, 1991

[54] AUTOMOBILE SIGNAL LAMP

[75] Inventors: Tsutomu Machida; Yoshiaki Ishida; Katsumi Muramatsu, all of Shimizu, Japan

[73] Assignee: Koito Manufacturing Co., Ltd., Shizuoka, Japan

[21] Appl. No.: 475,545

[22] Filed: Feb. 6, 1990

[30] Foreign Application Priority Data

Feb. 9, 1989 [JP] Japan .................... 1-14471

[51] Int. Cl.⁵ ............................................. B60Q 1/44
[52] U.S. Cl. .................... 362/80.1; 362/216; 362/800
[58] Field of Search ............. 362/61, 80, 83.3, 80.1, 362/800, 216, 217, 219, 223, 235, 236, 237

[56] References Cited

U.S. PATENT DOCUMENTS

| | | | |
|---|---|---|---|
| 4,521,835 | 6/1985 | Meggs et al. | 362/216 |
| 4,591,954 | 5/1986 | Kawamura et al. | 362/80.1 |
| 4,733,335 | 3/1988 | Serizawa et al. | 362/80 |
| 4,845,600 | 7/1989 | Matsumura et al. | 362/80 |
| 4,862,330 | 8/1989 | Machida et al. | 362/61 |

FOREIGN PATENT DOCUMENTS

| | | | |
|---|---|---|---|
| 0060448 | 3/1989 | Japan | 362/83.3 |
| 0145247 | 6/1989 | Japan | 362/80 |

Primary Examiner—Ira S. Lazarus
Assistant Examiner—Sue Hagerman
Attorney, Agent, or Firm—Sughrue, Mion, Zinn, Macpeak & Seas

[57] ABSTRACT

An automobile signal lamp of the type including a light source disposed in a lamp space which is elongated in left and right directions and of a reduced size in vertical directions. A top wall portion and a bottom wall portion constituting the lamp space are formed of synthetic resin material respectively, and are curved in the same direction in the vertical directions, or as viewed in the front view.

10 Claims, 9 Drawing Sheets

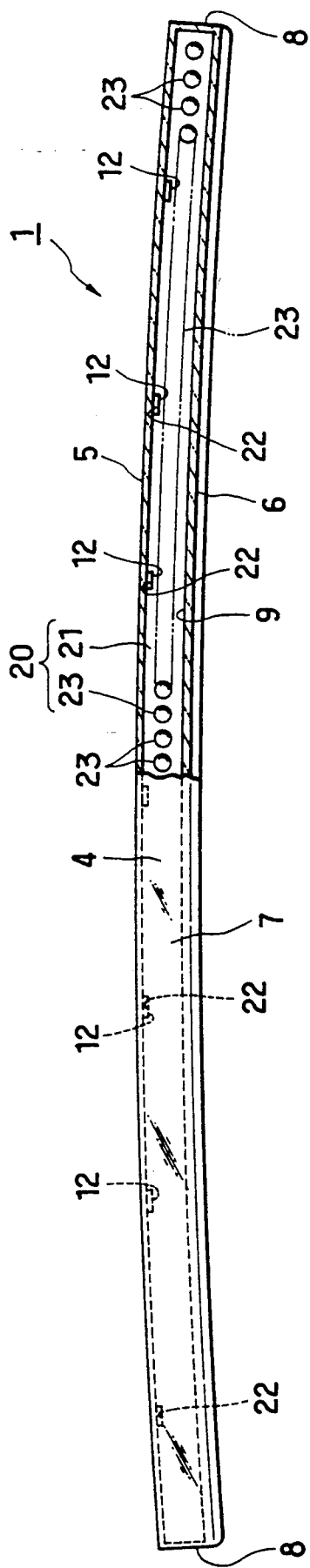
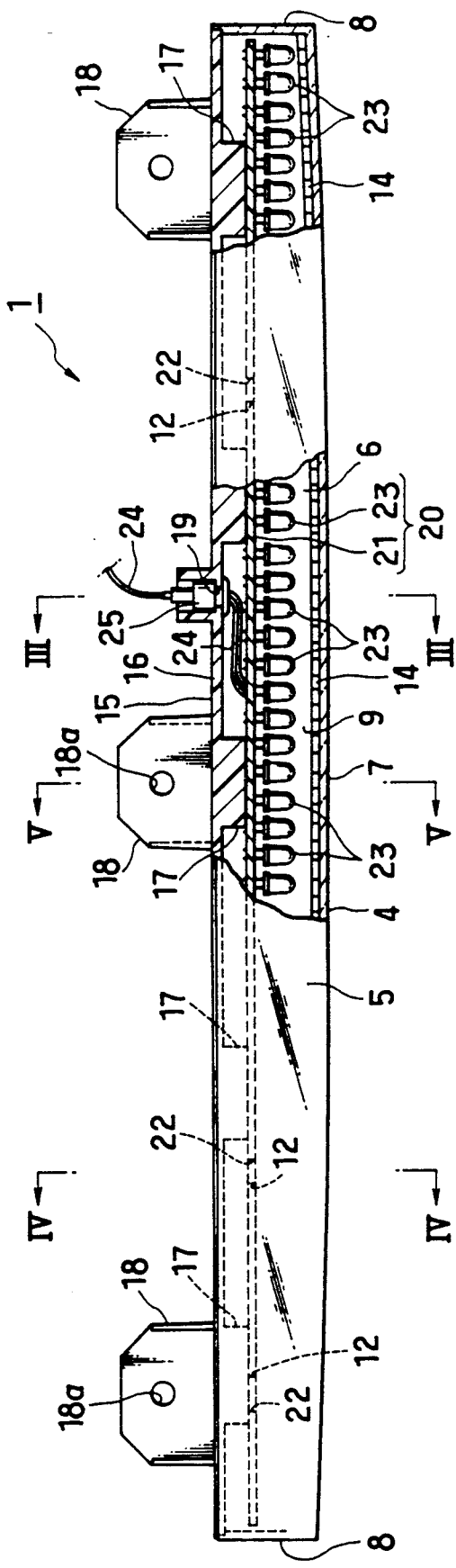
FIG. 1
FIG. 2

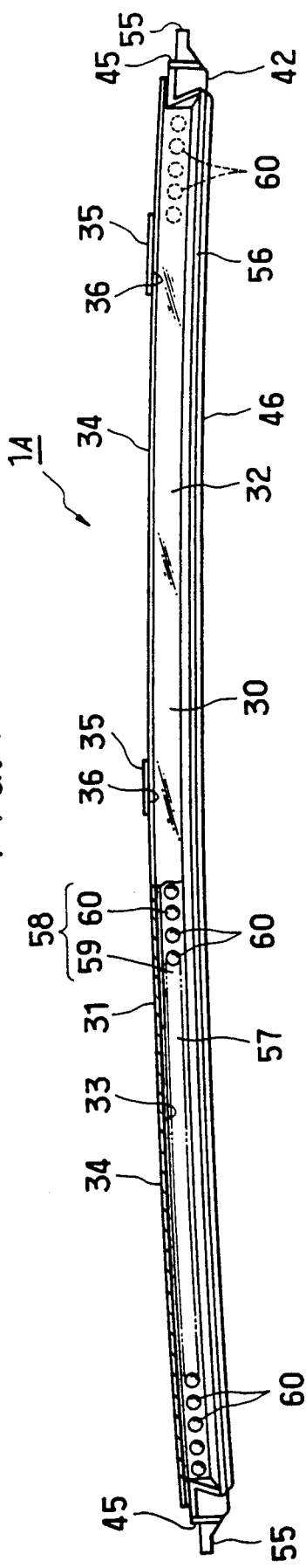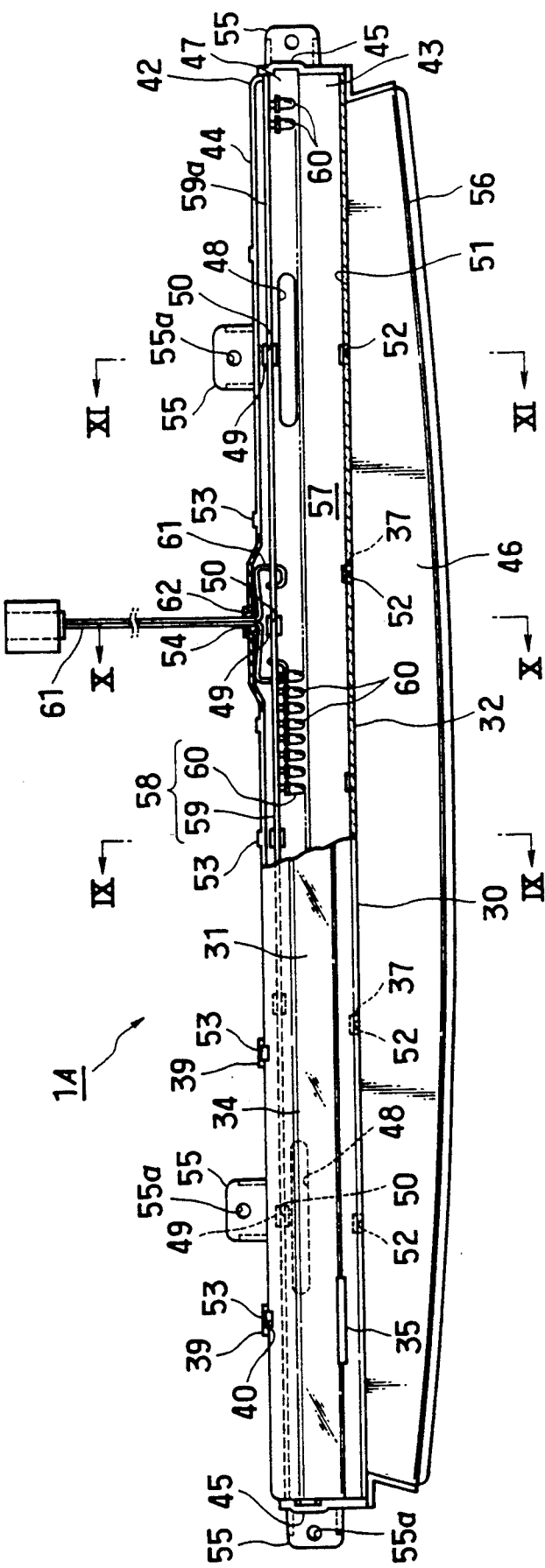

AUTOMOBILE SIGNAL LAMP

FIELD OF THE INVENTION

The present invention relates to an automobile signal lamp and, particularly to an automobile signal lamp of the type having a lamp space being elongated in left and right directions and of a reduced size in the vertical directions for receiving therein a light source.

DESCRIPTION OF PRIOR ART

FIGS. 12 and 13 show a prior art automobile signal lamp b of aforesaid type. The lamp b is a stop lamp mounted on a rear spoiler a.

The rear spoiler a has a wing-shaped section and the lamp b is mounted in a cutout recess c formed in lower surface of the tip end portion of the rear spoiler a and has the shape corresponding to the recess c, thus it is elongated in left and right directions and of a reduced size in the vertical directions.

In FIG. 12, the lamp b includes a lens member d being formed of a transparent synthetic resin material and of a generally lay down U-shape having a rearward opening recess e with the opening in the rear edge being closed by a cover member f.

Thus, the lens member d and the cover member f define a lamp space g the size of which is elongated in the left and right directions and of a reduced size in the vertical directions and includes a top wall portion h, a bottom wall portion i and side wall portions.

A light source member j is disposed in the lamp space g and includes a printed circuit board k and a plurality of light emitting diodes l, l . . . mounted on the front surface of the printed circuit board k.

In above described prior art automobile signal lamp, the top wall portion h and a bottom wall portion i which constitute the lamp space g tend to distort due to the thermal contraction during the die-forming process and, as shown in FIG. 13, the central portion in the left and right directions tends to deform inward and the heat of the light source e tends to stress the deformation.

An object of the invention is to provide an automobile signal lamp not having such shortcomings.

SUMMARY OF THE INVENTION

According to the present invention, there is provided an automobile signal lamp of the type including a light source disposed in a lamp space which is elongated in left and right directions and of a reduced size in vertical directions, in which a top wall portion and a bottom wall portion constituting the lamp space are formed of synthetic resin material and are curved in the same direction in the vertical directions.

According to the invention, the top wall portion and a bottom wall portion constituting the lamp space are curved in the same direction in the vertical directions, thus, it is possible to minimize the deformation due to the thermal shrinkage during the die-forming process and due to the heat of the light source and, further, it is possible to permit some amount of deformation.

BRIEF DESCRIPTION OF THE DRAWINGS

Further objects and effects of the invention will become apparent from the following detailed description in conjunction with the drawings, in which:

FIG. 1 illustrates a partially broken front view of an automobile signal lamp according to a first embodiment of the present invention;

FIG. 2 is a partially broken plan view of the signal lamp of FIG. 1;

FIG. 7 is a partially broken front view of a signal lamp according to a second embodiment of the invention;

FIG. 8 is a partially broken plan view of the signal lamp of FIG. 7;

DETAILED DESCRIPTION OF PREFERRED EMBODIMENTS

FIRST EMBODIMENT

Figure 3:
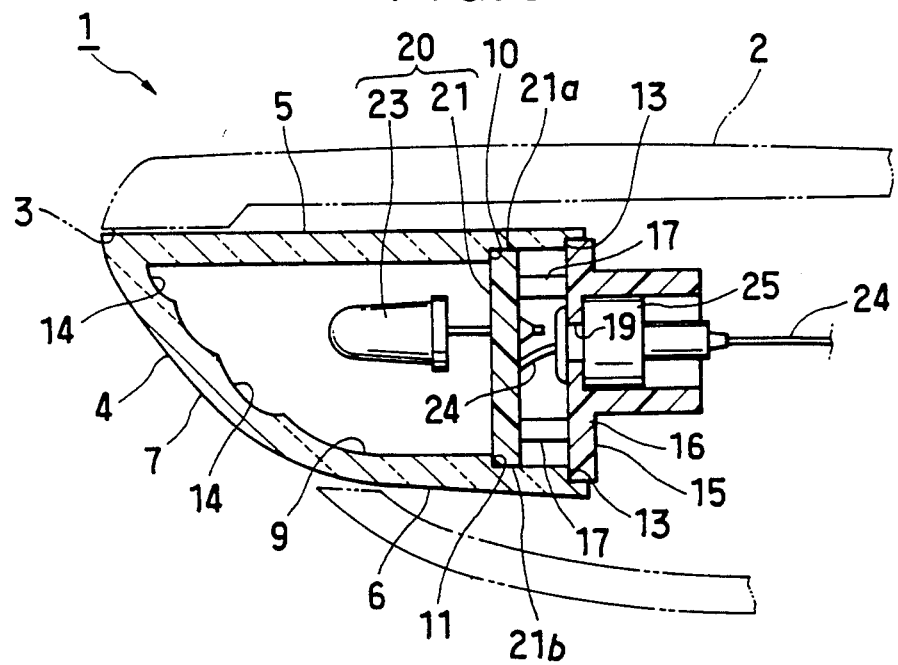
FIG. 3 is an enlarged sectional view of the automobile signal lamp of FIG. 1 taken along line III—III in FIG. 2.
Figure 4:
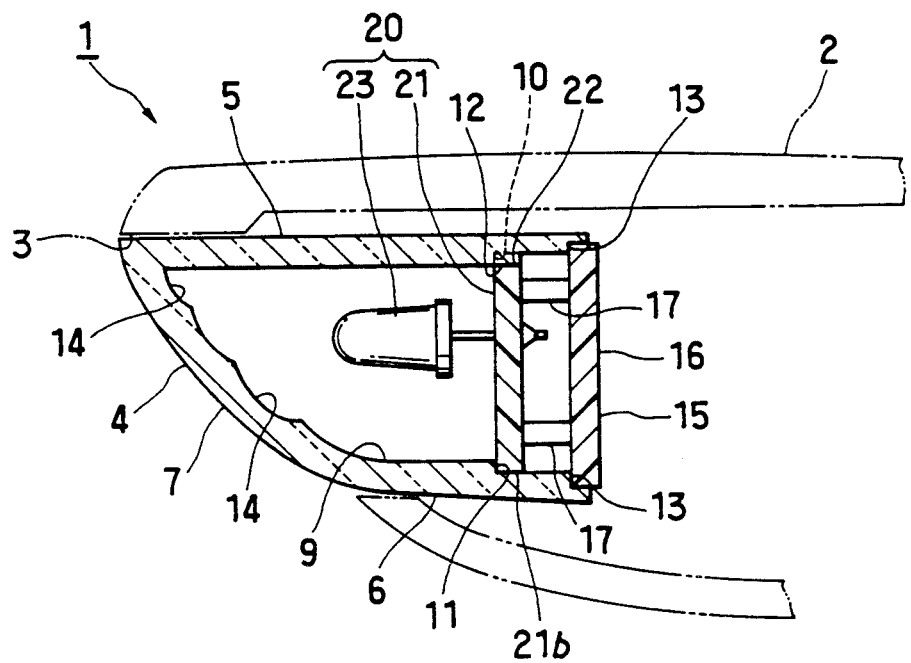
FIG. 4 is an enlarged sectional view taken generally along line IV—IV in FIG. 2.

FIG. 1 through FIG. 6 show an automobile signal lamp 1 according to a first embodiment of the present invention and, which is a stop lamp mounted on the tip end or the rear end of a rear spoiler 2 of an automobile.

The rear spoiler 2 is formed to have in the rear end a cutout 3 being elongated in left and right directions and opening in the rear and lower directions and, the lamp 1 is mounted in the cutout 3.

Lens Member

Shown at numeral 4 is a lens member being formed of a transparent thermoplastic synthetic resin material and, preferably by injection molding process. Since the lamp 1 is a stop lamp, the lens member 4 is formed of a red colored synthetic resin material.

The lens member 4 comprises a top wall portion 5 and a bottom wall portion 6 which are elongated in left and right directions and have strip-like shape, further, the lens member 4 includes a front wall portion 7 integrally connected to the front ends of the top wall portion 5 and the bottom wall portion 6 and, side wall portions 8 and 8 integrally connected to opposite side ends of the top wall portion 5, bottom wall portion 6 and the front wall portion 7. (It will be understood that the front and rear directions with respect to the stop lamp 1 are determined such that the direction of the light beam or the rear direction with respect to the automobile is the front direction, and the front direction with respect to the automobile is defined as the rear direction.)

Thus, the lens member 4 defines therein a recess or a lamp space 9 which opens rearward.

The top wall portion 5 and the bottom wall portion 6 are curved, as shown in FIG. 1, such that the central portions in left and right directions are slightly higher than opposite end portions.

On the inner surfaces of the top wall portion 5 and the bottom wall portion 6, there are formed mounting steps 10 and 11 respectively to extend in left and right directions and facing rearward. On the upper step 10, a plurality of locating and engaging projections 12, 12 . . . are formed in spaced relationship in the left and right directions.

A shallow cutout 13 is formed in each of the rear ends of the top wall portion 5 and the bottom wall portion 6.

Shown at numerals 14, 14 and 14 are lens steps formed on the inner surface of the front wall portion 7 of the lens member 4 and are formed into three, upper, middle and lower steps. These lens steps 14, 14 and 14 are arranged to conform with the curvature of the top wall portion 5 and the bottom wall portion 6 as seen in the front view.

Cover Member

Shown at numeral 15 is a cover member being formed of a synthetic resin material, preferably of the type similar to that of the lens member 4.

The cover member 15 includes a plate like main portion 16 and retaining pieces 17 and 17 integrally formed on the front surface of the main portion 16 to project forward. The main portion 16 has a form adapted to be fitted in the rear cutouts 13 and 13 in the lens member 4, and the thickness of which is slightly larger than the depth of the rear cutouts 13 and 13.

The cover member 15 is secured to the lens member 4 by fitting the main portion 16 in the cutouts 13 and 13 in the lens member 4 and, connecting together along the entire circumference by supersonic welding, whereby a closed lamp space is defined between the lens member 4 and the cover member 15.

There are formed mounting pieces 18, 18 and 18 on the rear surface of the main portion 16 of the cover member 15 to project rearward and being spaced in the left and right directions. Mounting holes 18a, 18a and 18a are formed respectively in the mounting pieces 18, 18 and 18.

An outlet opening 19 is formed in the main portion 16.

Light Source Member

A light source member 20 is disposed in the lamp space 9, and comprises a printed circuit board 21 and light emitting diodes 23, 23 . . . being mounted on the circuit board 21.

The printed circuit board 21 is a plate like member elongated in left and right directions, with the upper and lower edges thereof being curved as shown in FIG. 1 to conform with the curvature of the top plate portion 5 and bottom plate portion 6 of the lens member 4, namely, as seen in the front view, the upper edge 21a forms a convex curve, and the lower edge 21b forms a concave curve. A plurality of engaging recesses 22, 22 . . . are formed in the upper edge 21a corresponding to engaging projections 12, 12 . . . on the upper step 10 of the lens member 4.

The light emitting diodes (LED) 23, 23 . . . are of the same quality and are arranged in a curved line extending in the left and right directions and corresponding to the curvature of the top wall portion 5 and the bottom wall portion 6.

One ends of electric cords 24 are connected to printed pattern (not show) on the printed circuit board 21 for supplying electric power to LED 23, 23 . . . and, the cords 24 pass through a rubber grommet 25 in the outlet opening 19 and extend to the outside.

The light source member 20 is clamped between the lens member 4 and the cover member 15. In particular, front surfaces of the upper and lower edges 21a and 21b of the printed circuit board 21 abut respectively with mounting steps 10 and 11 on the lens member 4. At this time, the engaging recesses 22, 22 . . . formed in the upper edge 21a of the printed circuit board 21 engage respectively with the engaging projections 12, 12 . . . formed on the upper mounting step 10, whereby the printed circuit board 21 is located with respect to the lens member 4 in left and right directions.

The cover member 15 is welded to the lens member 4 at this condition by supersonic welding process, then, the tip ends or the front ends of the retaining pieces 17 and 17 cooperate with the mounting steps 10 and 11 on the lens member 4 to clamp the printed circuit board 21 therebetween. It is possible to provide between the tip ends of the retaining pieces 17 and 17 and the printed circuit board 21 suitable resilient members.

In the assembled condition described as above, LED 23, 23 . . . face the middle of the lens steps 14, 14 and 14.

Mounting

Figure 5:
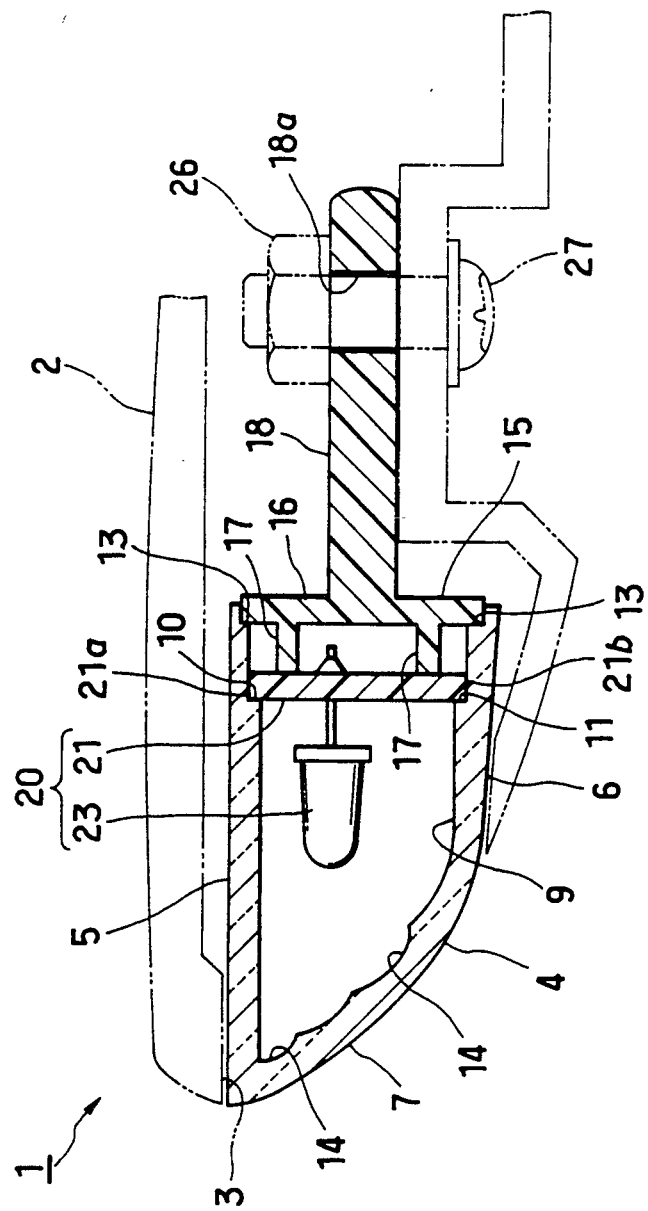
FIG. 5 is an enlarged sectional view taken generally along line V—V in FIG. 2.
Figure 6:
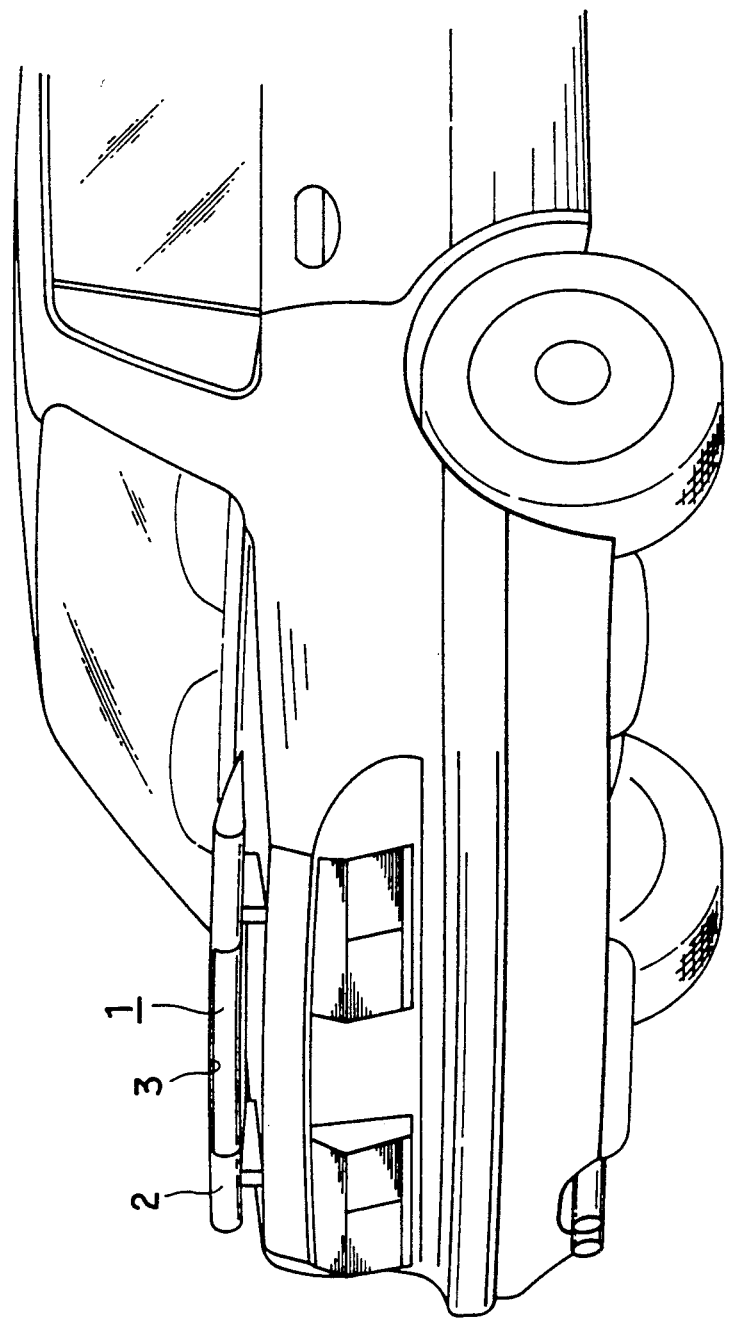
FIG. 6 is a perspective view showing an example of utilization of the signal lamp of FIG. 1.

The rear spoiler 2 has nuts 26, 26 and 26 (only one is shown in FIG. 5) embedded therein and, the stop lamp 1 is mounted in the recess 3 in the rear spoiler 2 by passing mounting screws 27, 27 and 27 through mounting holes 18a, 18a and 18a in the mounting pieces 18, 18 and 18 of the stop lamp 1 and threading into the nuts 26, 26 and 26 respectively.

SECOND EMBODIMENT

FIG. 7 through FIG. 11 show an automobile signal lamp 1A according to the second embodiment of the invention.

Figure 9:
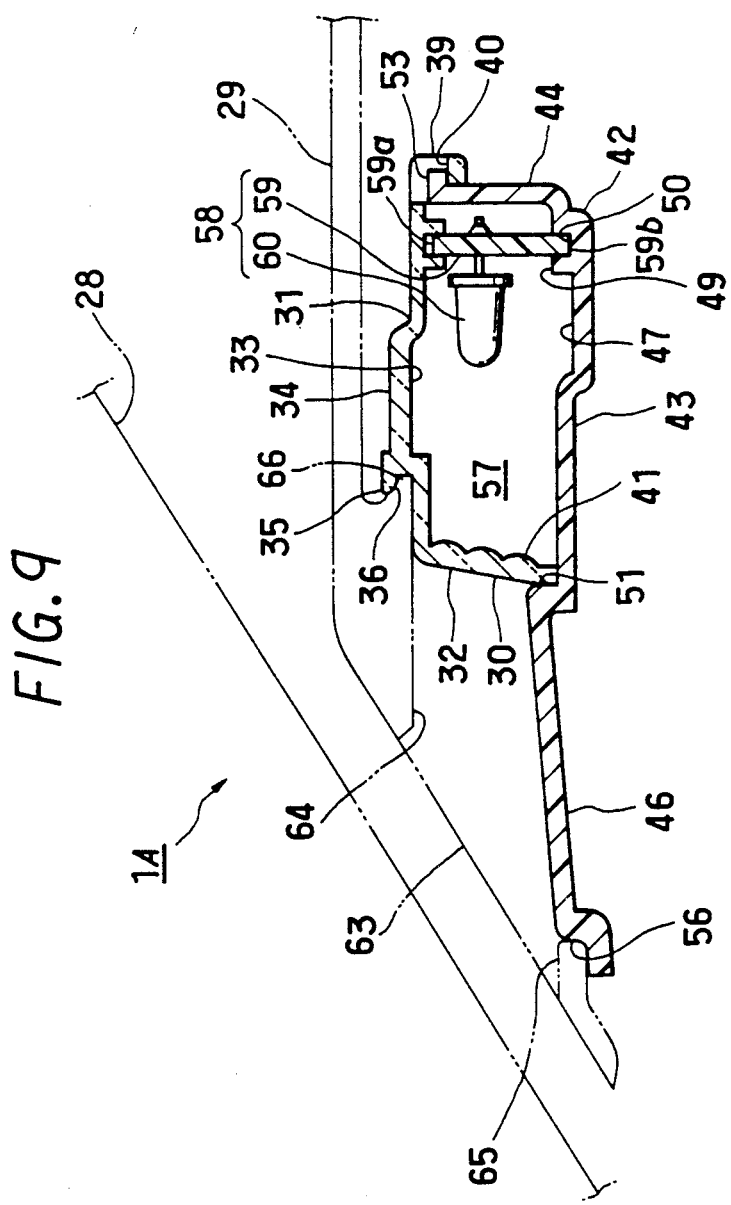
FIG. 9 is an enlarged sectional view taken generally along line IX—IX in FIG. 8.
Figure 10:
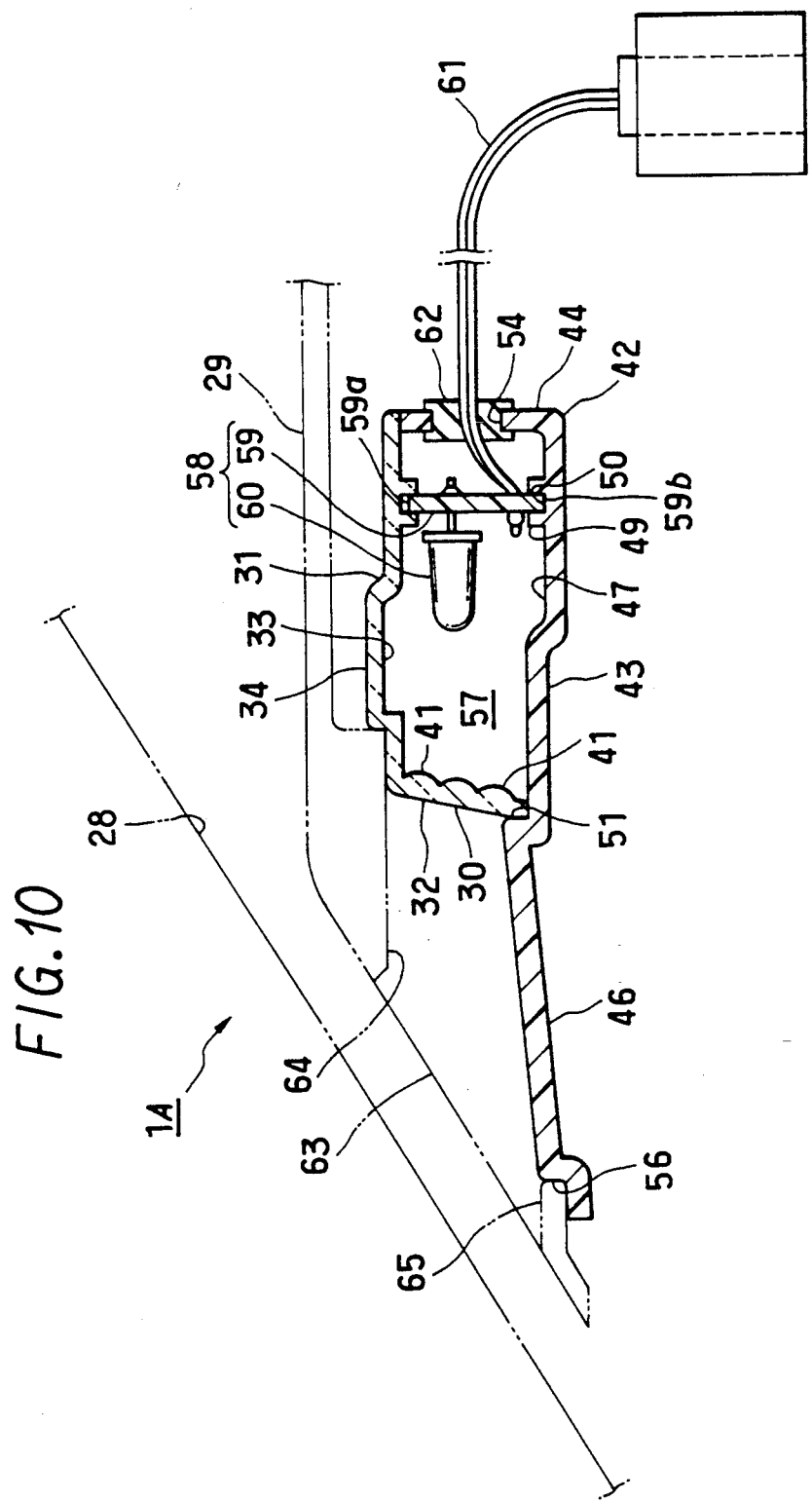
FIG. 10 is an enlarged sectional view taken generally along line X—X in FIG. 8.
Figure 11:
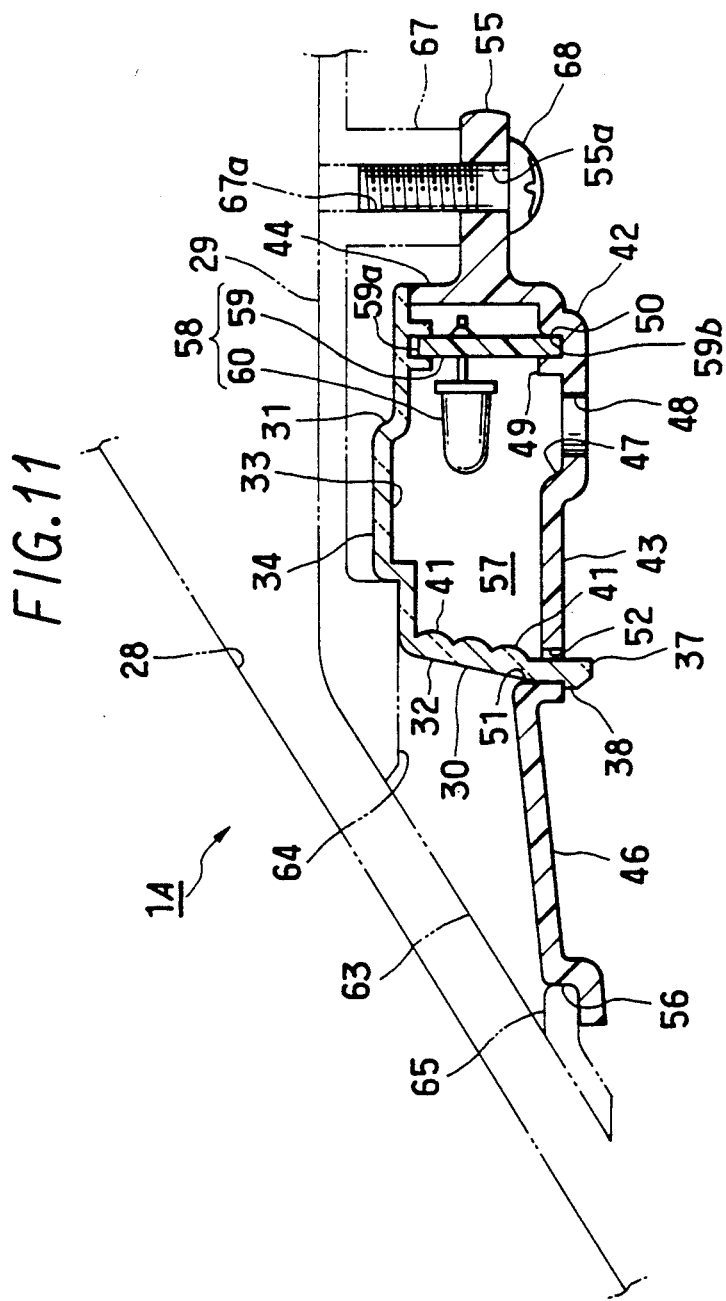
FIG. 11 is an enlarged sectional view taken generally along line XI—XI in FIG. 8.
Figures 12, 13:
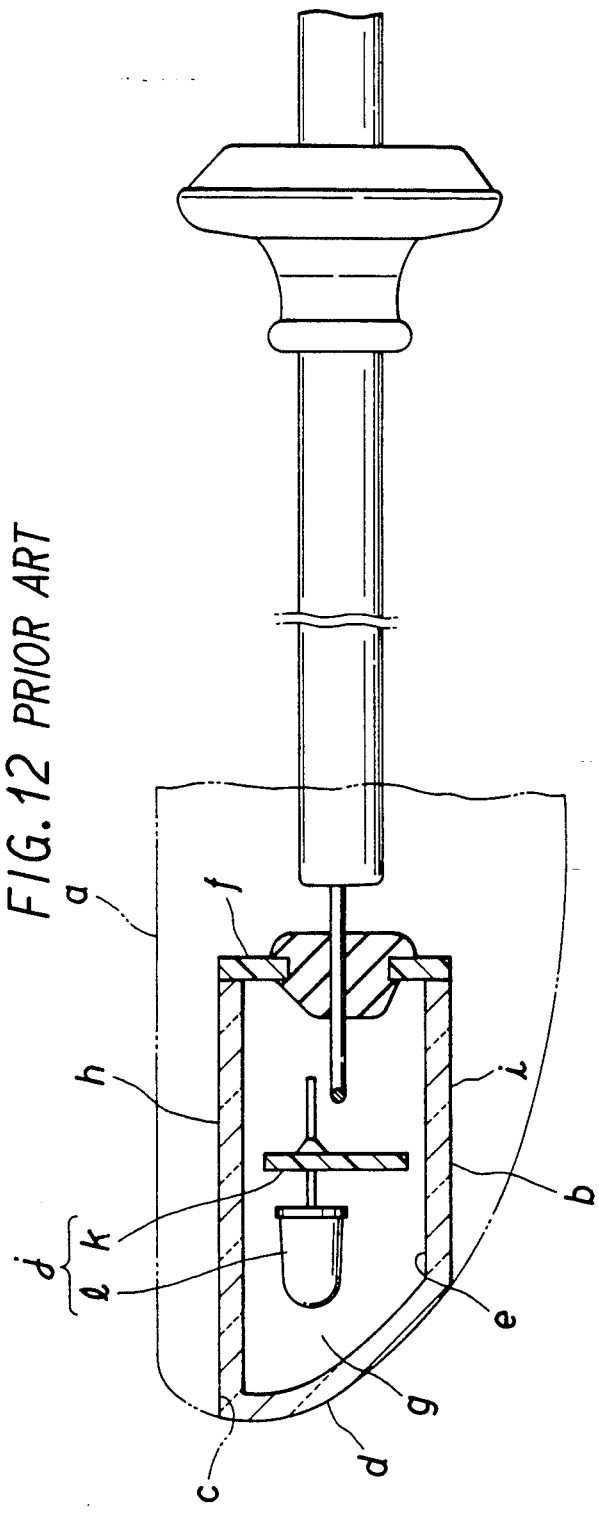
FIG. 12 is a sectional view showing a typical prior art automobile signal lamp.
FIG. 13 is a partially broken front view of the signal lamp of FIG. 12 and showing the deformation.

The signal lamp 1A is so-called high mount stop lamp which is mounted inside of a rear window 28 of an automobile and, as shown in FIGS. 9, 10 and 11, the lamp 1A is mounted lower side of a rear garnish 29 which is mounted generally horizontally and contacting with the inside of the lower portion of the rear window 28.

Lens Member

The signal lamp 1A comprises a lens member 30 which is formed of a transparent thermoplastic synthetic resin material and, preferably by injection molding process. The lamp 1A in the embodiment is also a stop lamp, thus, the lens member 30 is formed of a red colored material.

The lens member 30 has an elongated shape in left and right directions and has integrally a top wall portion 31 and a front wall portion 32 extending generally in downward direction from the front end of the top wall portion 31.

The top wall portion 31 is curved in the front view so that the central portion in left and right directions is slightly higher than opposite side portions as clearly seen in FIG. 7, and has the cross-section defining inside or in the lower surface a recessed portion 33 extending in left and right directions and, on the upper side or the outside a projecting portion 34 extending in left and right directions.

On the front upper edge of the projecting portion 34, there are formed projecting pieces 35, 35 and 35 being spaced in left and right directions with each other and projecting forward respectively to define between the upper surface of the top wall portion 31, the surface of the front edge of the projecting portion 34 and lower surfaces of the projecting pieces 35, 35 and 35 engaging grooves 36, 36 and 36 which open forward respectively.

Shown at 37, 37 . . . are engaging pawls projecting downward from the lower end of the front wall portion 32 and are spaced each other in left and right directions, and have pawl portions 38, 38 . . . on the front surfaces thereof respectively.

Shown at 39, 39 . . . are receiving pieces projecting downward from the rear end of the top wall portion 31 of the lens member 30 and are spaced each other in left and right directions, and have respectively openings 40, 40 . . . therein.

There are formed lens steps 41, 41 and 41 on the inner surface of the front wall portion 32 of the lens member 30 which are formed into three, upper, middle and lower steps. Each of the steps 41, 41 and 41 is arranged to conform with the curvature of the top plate portion 31 as viewed in the front view.

Body Member

Shown at 42 is a body member formed preferably of an opaque thermoplastic synthetic resin material.

The body member 42 is elongated in the left and right directions and includes integrally a bottom wall portion 43, a rear wall portion 44 extending vertically upward from the rear end of the bottom wall portion 43, side wall portions 45 and 45 connected to opposite sides of the bottom wall portion 43 and the rear wall portion 44, and extending portion connected to the front end of the bottom wall portion and extending generally forward.

The bottom wall portion is curved convex upward such that the central portion is slightly higher than both side portions, and in the central portion in the cross-section there formed a step so that the portion of rear half is is slightly lower than that of the front half to define a recess 47 as shown in FIG. 9. The recess 47 extends in the left and right directions and there are formed heat dissipating openings 48 and 48 therein.

Projections 49, 49 . . . are formed on the inner surface of the recess 47 at locations near to the rear wall portion 44 and define respectively supporting grooves 50, 50 . . . as shown in FIGS. 8, 9 and 10.

There is formed a rearward facing step 51 between the upper surfaces of the bottom wall portion 43 and the extending portion 46 and, engaging openings 52, 52 . . . in the bottom wall portion 43 at locations near to the step 51 and corresponding the engaging pawls 37, 37 . . . of the lens member 30.

As shown in FIGS. 8 and 9, pawl members 53, 53 . . . are formed on the upper edge of the rear surface of the rear wall portion 44 to correspond the engaging openings 40, 40 . . . in the lens member 30.

An outlet opening 54 is formed in generally central portion of the rear wall portion 44.

Mounting pieces 55, 55 . . . are formed on the rear wall portion 44 and on the side wall portions 45 and 45 to project outward respectively and have respectively mounting openings 55a, 55a . . . as shown in FIGS. 8 and 11.

The front edge of the extending portion 46 is curved, as shown in FIG. 8, such that the central portion in left and right directions projects forward as compared with opposite side portions and, the front edge is, as shown in FIGS. 9 through 11, bent to define a upward facing engaging step 56.

In assembling, the lens member 30 is located above the body member 42, with the engaging pawls 37, 37 . . . of the lens member 30 aligning respectively with the openings 52, 52 . . . in the body member 42 and the pawl members 53, 53 . . . of the body member 42 aligning respectively with the engaging openings 40, 40 . . . in the lens member 30 and, at that condition, the lens member 30 and the body member 42 are forcively pushed against each other. Then, the lower ends of the engaging pawls 37, 37 . . . of the lens member 30 deflect rearward respectively, the receiving pieces 39, 39 . . . of the lens member 30 deflect rearward respectively and the upper end of the rear wall portion 44 of the body member 42 deflects forward such that the lower ends of the engaging pawls 37, 37 . . . of the lens member 30 pass through the openings 52, 52 . . . in the body member 42 respectively and the pawls 38, 38 . . . thereon engage respectively with front lower edges of the openings 52, 52 . . . respectively, and respective pawl members 53, 53 . . . of the body member 42 engage with the lower edges of the engaging openings 40, 40 . . . in the lens member 30. Thus, the lens member 30 and the body member 42 are connected reliably, and the lamp space 57 is defined therein.

Light Source Member

A light source member 58 is disposed in the lamp space 57, and comprises a printed circuit board 59 and light emitting diodes 60, 60 . . . mounted on the front surface of the printed circuit board 59.

The upper and lower edges of the printed circuit board 59 are curved in the front view conforming with the top wall portion 31 of the lens member 30 and with the inner surface of the bottom wall portion 43 of the body member 40. In particular, the upper edge 59a is curved convex and the lower edge 59b is curved concave in the front view, as shown in FIG. 7. The arrangement of the light emitting diodes 60, 60 . . . is also curved to conform with the curvature of the top wall portion 31 of the lens member 30 and of the bottom wall portion 43 of the body member 40.

Shown at 61 is electric cord connected to conductive pattern (not shown) on the printed circuit board 59 for supplying electric power to the light emitting diodes 60, 60 . . . from a source of electric power source.

The lower edge 59b of the printed circuit board 59 is fitted in and supported by respective supporting grooves 50, 50 . . . in the inner surface of the bottom wall 43 of the body member 42, and the upper edge 59a of the printed circuit board 59 abut with the inner surface of the top wall portion 31 of the lens member 30, whereby the light source member 58 is clamped between the bottom wall portion 43 of the body member 42 and the top wall portion 31 of the lens member 30, and is located in the lamp space 57.

Shown at 62 is a rubber grommet mounted in the outlet opening 54 in the rear wall portion 44 of the body member 42, and the cord 61 passes through the grommet 62 to extend outside of the lamp space 57.

When the light source member 58 is located in the lamp space 57, the light emitting diodes 60, 60 . . . are located to oppose the middle of the lens steps 41, 41 . . .

Mounting

Shown at 63 is the rear surface portion of the rear garnish 29 and is located along the inner surface of the rear window 28. A window 64 elongated in left and right direction is formed in the rear surface portion 63, and a projecting edge 65 is formed to project inward from the lower edge of the window 64, and projecting pieces 66, 66 and 66 are formed at locations spaced inward from the upper edge of the window 64 respectively to project inward.

There are formed boss seats 67, 67 . . . respectively on the inner surface of the rear garnish 29 to depend therefrom and screw-threaded holes 67a, 67a . . . opening in the lower surfaces are formed in respective boss seats 67, 67 . . . as shown in FIG. 11.

In mounting the automobile signal lamp 1A on the rear garnish 29, the engaging grooves 36, 36 and 36 in the top surface portion 31 of the lens member 30 engage with the engaging projections 66, 66 and 66 on the rear garnish 29 respectively, and the engaging step 56 formed on the front end portion of the extending portion 46 of the body member 42 engages with the inner edge of the projecting edge 65 on the rear surface portion 63 of the rear garnish 29. Then, the mounting pieces 55, 55 . . . of the signal lamp 1A abut respectively with the lower surfaces of the boss seats 67, 67 . . . of the rear garnish 29, with the mounting holes 55a, 55a . . . in the mounting pieces 55, 55 . . . aligning with the threaded holes 67a, 67a . . . of the boss seats 67, 67 . . . respectively.

By inserting mounting screws 68, 68 . . . through the mounting holes 55a, 55a . . . in the mounting pieces 55, 55 and threading respectively into the threaded holes 67a, 67a . . . of the boss seats 67, 67 . . . , the signal lamp 1A is reliably mounted on the rear garnish 29.

Advantages of the Invention

As described heretofore in detail, the automobile signal lamp according to the present invention is of the type including a light source disposed in a lamp space which is elongated in left and right directions and of a reduced size in vertical directions. The lamp space is constituted of a top wall portion and a bottom wall portion, and which portions are respectively formed of synthetic resin material and are curved in the same direction in the vertical directions, or in the front view. Thus, according to the invention, since the top wall portion and the bottom wall portion are curved in the same direction, the deformation due to the thermal shrinkage during the die-forming process or to the heat of the light source can be reduced to the minimum, and such curved shape can permit some amount of deformation without causing serious discrepancies.

It will be understood that various changes can be made within the scope of the invention.

What is claimed is:

1. In an automobile signal lamp of the type including a lamp body having an upper wall portion and a lower wall portion and a light source disposed within said lamp body in a lamp space defined between said upper wall portion and said lower wall portion and which is elongated in left and right directions and of a reduced size in vertical directions, the improvement wherein said top wall portion and said bottom wall portion are formed of synthetic resin material and are curved in the same direction in the vertical direction such that a distance between a horizontal line and a central portion of said lamp body is different than a distance between said horizontal line and opposite end portions of said lamp body.

2. An automobile signal lamp according to claim 1, in which the top wall portion is defined on a lens member and the bottom wall portion is defined on a body member, said lens and body members are respectively formed of thermoplastic synthetic resin material.

3. An automobile signal lamp according to claim 2, in which the lens member is formed of a colored synthetic resin material.

4. An automobile signal lamp according to claim 2, in which said lens and body members are connected together to define said lamp space by projection and recess connecting means provided on respective members.

5. An automobile signal lamp according to claim 4, in which said projection and recess connecting means includes a resilient pawl and an opening for receiving said pawl.

6. An automobile signal lamp according to claim 1, in which a light souce is received in the lamp space and is curved correspondingly to the top wall portion and the bottom wall portion.

7. An automobile signal lamp according to claim 6, in which the light source comprises a printed circuit board and a plurality of light emitting diodes mounted on the printed circuit board.

8. An automobile signal lamp according to claim 7, in which the printed circuit board is clamped between the top wall portion and the bottom wall portion.

9. An automobile signal lamp according to claim 8, in which the printed circuit board is curved to conform with the curvature of the top wall portion and of the bottom wall portion.

10. An automobile signal lamp according to claim 1, wherein said central portion of said lamp body is higher than said end portions of said lamp body.

* * * * *